(12) United States Patent
Courtemanche et al.

(10) Patent No.: US 10,097,463 B2
(45) Date of Patent: *Oct. 9, 2018

(54) SYSTEM AND METHODS FOR EFFICIENT MEDIA DELIVERY USING CACHE

(71) Applicant: VANTRIX CORPORATION, Montreal (CA)

(72) Inventors: Marc Courtemanche, Montreal (CA); Jean Mayrand, Chambly (CA)

(73) Assignee: VANTRIX CORPORATION, Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/950,562

(22) Filed: Jul. 25, 2013

(65) Prior Publication Data

US 2013/0311596 A1    Nov. 21, 2013

Related U.S. Application Data

(63) Continuation of application No. 12/956,114, filed on Nov. 30, 2010, now Pat. No. 8,516,074.

(Continued)

(51) Int. Cl.
G06F 15/16     (2006.01)
G06F 15/173    (2006.01)
(Continued)

(52) U.S. Cl.
CPC ........ *H04L 47/122* (2013.01); *H04L 67/1095* (2013.01); *H04L 67/2852* (2013.01); *H04L 67/2895* (2013.01)

(58) Field of Classification Search
CPC ... H04W 8/14; H04L 12/1414; H04L 67/2852
(Continued)

(56) References Cited

U.S. PATENT DOCUMENTS 5,978,370 A    12/1999  Shively
6,289,358 B1    9/2001  Mattis et al.
(Continued)

FOREIGN PATENT DOCUMENTS

CN      1859610       11/2006
CN    101184091        5/2008
(Continued)

OTHER PUBLICATIONS

JPEG—Wikipedia, the free encyclopedia, http://en.wikipedia.org/wiki/JPEG, Aug. 5, 2007.
(Continued)

*Primary Examiner* — Faruk Hamza
*Assistant Examiner* — Abu-Sayeed Haque
(74) *Attorney, Agent, or Firm* — IP-MEX Inc.; Victoria Donnelly (57) ABSTRACT

To improve the efficiency of media delivery over the Internet, a system and a method are provided for caching remote media files and retrieving cached media files, comprising hardware and software modules as well as steps for storing a remote media file into the cache and retrieving the cached media file based on a signature created by hashing only discrete parts of the media file. The signature is a key for finding the cached media files in the cache upon subsequent requests for the same media file, even if it is received from a different internet location. Media files may be adapted to the characteristics of different media clients, and adapted media files may be equally cached.

23 Claims, 6 Drawing Sheets

Related U.S. Application Data (60) Provisional application No. 61/265,676, filed on Dec. 1, 2009.

(51) Int. Cl.
*G01R 31/08* (2006.01)
*H04J 3/00* (2006.01)
*H04L 12/803* (2013.01)
*H04L 29/08* (2006.01)

(58) Field of Classification Search
USPC .......................................................... 709/216
See application file for complete search history.

(56) References Cited

U.S. PATENT DOCUMENTS

| | | |
|---|---|---|
| 6,470,378 B1 | 10/2002 | Tracton et al. |
| 6,483,851 B1 | 11/2002 | Neogi |
| 6,563,517 B1 | 5/2003 | Bhagwat et al. |
| 6,785,732 B1 | 8/2004 | Bates et al. |
| 6,813,690 B1 | 11/2004 | Lango et al. |
| 6,888,477 B2 | 5/2005 | Lai et al. |
| 6,970,602 B1 | 11/2005 | Smith |
| 7,010,581 B2 | 3/2006 | Brown |
| 7,076,544 B2 | 7/2006 | Katz et al. |
| 7,409,464 B2 | 8/2008 | Jansson |
| 7,475,106 B2 | 1/2009 | Agnoli |
| 7,549,052 B2 | 6/2009 | Haitsma |
| 7,577,848 B2 | 8/2009 | Schwartz |
| 7,640,274 B2 | 12/2009 | Tinker |
| 7,692,666 B1 | 4/2010 | Bourgoin et al. |
| 7,831,900 B2 | 11/2010 | Lee |
| 7,876,766 B1 | 1/2011 | Atkins et al. |
| 7,890,619 B2 | 2/2011 | Morota et al. |
| 2001/0024386 A1 | 9/2001 | Harari |
| 2002/0103972 A1 | 8/2002 | Satran |
| 2002/2010397 | 8/2002 | Satran |
| 2002/0178271 A1* | 11/2002 | Graham .............. G06F 21/6245 709/229 |
| 2003/0097564 A1 | 5/2003 | Tewari |
| 2004/0001106 A1 | 1/2004 | Deutscher |
| 2004/0024897 A1 | 2/2004 | Ladd et al. |
| 2004/0032348 A1 | 2/2004 | Lai et al. |
| 2004/0111476 A1 | 6/2004 | Trossen et al. |
| 2004/0181550 A1 | 9/2004 | Warsta et al. |
| 2004/0221120 A1* | 11/2004 | Abrashkevich ....... G06F 12/023 711/170 |
| 2004/0268224 A1 | 12/2004 | Balkus |
| 2005/0187756 A1 | 8/2005 | Montgomery |
| 2005/0259796 A1 | 11/2005 | Wallenius et al. |
| 2006/0010226 A1 | 1/2006 | Hurtta et al. |
| 2006/0029192 A1 | 2/2006 | Duddley et al. |
| 2006/0095452 A1 | 5/2006 | Jansson et al. |
| 2006/0156218 A1 | 7/2006 | Lee |
| 2006/0161153 A1 | 7/2006 | Kiilerich |
| 2006/0161538 A1 | 7/2006 | Kiilerich |
| 2006/0174300 A1* | 8/2006 | Gu ...................... G06F 17/3028 725/100 |
| 2006/0210027 A1 | 9/2006 | Kafri et al. |
| 2006/0242550 A1 | 10/2006 | Rahman |
| 2007/0011256 A1 | 1/2007 | Klein |
| 2007/0067390 A1 | 3/2007 | Agnoli et al. |
| 2007/0150877 A1 | 6/2007 | Emmett et al. |
| 2007/0204318 A1 | 8/2007 | Ganesh |
| 2007/0216761 A1 | 9/2007 | Gronner et al. |
| 2008/0001791 A1 | 1/2008 | Wanigasekara-Mohotti et al. |
| 2008/0091840 A1 | 4/2008 | Guo et al. |
| 2008/0140720 A1 | 6/2008 | Six et al. |
| 2008/0196076 A1 | 8/2008 | Shatz et al. |
| 2008/0201386 A1 | 8/2008 | Maharajh |
| 2008/0226173 A1 | 9/2008 | Yuan |
| 2008/0229429 A1 | 9/2008 | Krig |
| 2008/0270436 A1* | 10/2008 | Fineberg ........... G06F 17/30097 |
| 2009/0083279 A1 | 3/2009 | Hasek |
| 2009/0088191 A1 | 4/2009 | Norton |
| 2009/0125677 A1 | 5/2009 | Ieveque |
| 2009/0193485 A1 | 7/2009 | Rieger et al. |
| 2009/0280844 A1 | 11/2009 | Norton |
| 2009/0067357 A1 | 12/2009 | Norton |
| 2009/0316715 A1 | 12/2009 | Saniee |
| 2010/0087179 A1* | 4/2010 | Makavy .................. H04L 67/36 455/418 |
| 2010/0094817 A1* | 4/2010 | Ben-Shaul ............ G06F 3/0608 707/697 |
| 2010/0114816 A1 | 5/2010 | Kiilerich |
| 2010/0153495 A1 | 6/2010 | Barger |
| 2010/0195538 A1* | 8/2010 | Merkey .................. H04L 43/02 370/255 |
| 2010/0281112 A1 | 11/2010 | Plamondon |
| 2010/0318632 A1* | 12/2010 | Yoo ........................ H04L 65/605 709/219 |
| 2011/0106822 A1 | 5/2011 | Golwalkar et al. |
| 2011/0131298 A1 | 6/2011 | Courtmanche |
| 2011/0161409 A1 | 6/2011 | Nair |
| 2011/0264865 A1 | 10/2011 | Mobarak |
| 2012/0173907 A1 | 7/2012 | Moses |
| 2012/0323872 A1 | 12/2012 | Vasquez Lopez |
| 2013/0042022 A1 | 2/2013 | Norton et al. |
| 2013/0046849 A1 | 2/2013 | Wolf |
| 2013/0204961 A1 | 8/2013 | Filam |

FOREIGN PATENT DOCUMENTS

| | | |
|---|---|---|
| EP | 1001582 A2 | 5/2000 |
| EP | 1460848 A2 | 9/2004 |
| EP | 1482735 | 12/2004 |
| JP | 09325413 | 12/1997 |
| JP | 2001-007809 | 4/2001 |
| JP | 2001-117809 | 4/2001 |
| JP | 2002108870 | 12/2002 |
| JP | 2003143575 | 5/2003 |
| JP | 2003337739 | 11/2003 |
| JP | 2004078354 | 3/2004 |
| JP | 2004-526227 | 8/2004 |
| JP | 2005-527881 | 9/2005 |
| JP | 2007053699 | 3/2007 |
| JP | 2007-158687 | 6/2007 |
| WO | 2002052730 | 7/2002 |
| WO | 2003040893 | 5/2003 |
| WO | WO 2004/088951 | 10/2004 |
| WO | WO2004097688 A1 | 11/2004 |
| WO | WO2006/023302 | 3/2006 |
| WO | WO 2007/032606 | 3/2007 |
| WO | 2007037726 | 4/2007 |
| WO | WO2007037726 A1 | 4/2007 |
| WO | WO 2007/060521 | 5/2007 |
| WO | WO 2007/075201 | 7/2007 |
| WO | WO2012-088023 A2 | 6/2012 |

OTHER PUBLICATIONS

Advanced Audio Coding—Wikipedia, the free encyclopedia, http://en.wikipedia.org/wiki/Advanced_Audio_Coding, Aug. 5, 2010.
Synchronized Media Integration Language (SMIL) 2.0 Specification W3C Recommendation http://www.w3.org/TR/smil20/, Aug. 7, 2001.
"The independent JPEG Group" ftp.uu.net/graphics/jpeg/jpegsrc. v6b.tar.gz, Aug. 3, 2007.
International Search Report and Written Opinion rendered by Canadian Intellectual Property Office, dated Sep. 30, 2008.
"Multimedia Adaptation for Multimedia Messaging Service" Stephane Coulombe and Guido Grassel, IEEE Communication Magazine, vol. 42, No. 7, p. 120-126, Jul. 2004.
International Search Report issued by CIPO for PCT/CA2008/002286 dated Apr. 20, 2009.
Coskun, Baris, Sankur, Bulent "Robust Video Hash Extraction" article available at <citeseerx.ist.psu.edu/viewdoc/download?doi=10.1.1.113.9934.pdf> European Signal Processing Conference EUSIPCO 2004.

(56) References Cited

OTHER PUBLICATIONS

OMA Multimedia Messaging Service, Architecture Overview, Approved Version 1.2 01, published by Open Mobile Alliance, available from http://www.openmobilealliance.org/release_program/mms_v1_2.html, Mar. 2005.

Open Mobile Alliance document OMA-AD-STI-V1_0-20270515-A "Architecture of the Environment using the Standard Transcoding Interface" Approved Version 1.0-15, published by Open Mobile Alliance, May 2007.

3GPP TS 26.140 V7.1.0, Technical Specification 3rd Generation Partnership Project;Technical Specification Group Services and System Aspects; Multimedia Messaging Service (MMS); Media formats and codecs (Release 7) available from http://www.3gpp.org/ftp/Specs/html-info/26140.htm, Jun. 6, 2007.

Relational Database System (RDBS), available from http://www.mysql.org/ published by Sun Microsystems, available prior to Nov. 12, 2007.

Request for Comments (RFC)1321 "The MD5 Message-Digest Algorithm", R. Revest, available from http://tools.ietf.org/html/rfc1321 published by IEFT (Internet Engineering Task Force) Apr. 1992.

MM1, MM3, MM4, MM7 are defined by the 3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip), Nov. 6, 2006.

"Internet Content Adaptation Protocol (ICAP)"J. Elson, Request for Comments (RFC) 3597 available from http://www.ietf.org/rfc/rfc3507.txt, Apr. 2003.

Nokia Multimedia Messaging Service Center, External Application Interface, Frequently Asked Questions, Reference for External Application Interface (EAIF) protocol available at http://www.forum.nokia.com/info/sw.nokia.com/id/d0ee4125-3879-4482-b55d-90e3afe17a31/Ext_App_Interface_FAQ.pdf.html published by Nokia, prior to Nov. 12, 2007.

Synchronized Multimedia Integration Language (SMIL) 1.0 Specification, published by W3C organization at http://www.w3.org/TR/REC-smil Jun. 15, 1998.

Tayeb Lemlouma, Nabil Layaida "Encoding Multimedia Presentations for User Preferences and Limited Environments" Proceedings of IEEE International Conference on Maultimedia &Expo (ICME), IEEE Computer Society, 2003, p. 165-168.

Multimedia Messaging Service, Media Formats and Codecs 3GPP TS 26.140, V 7.1.0, http:// www.3gpp.org/ftp/specs/html-info/26140.htm, Jun. 2007, p. 13.

S.Coulombe et al., Multimedia Adaptation for the Multimedia Messaging Service, IEEE Communication Magazine, vol. 42, No. 7, p. 120-126, Jul. 2004.

3GPP in 3GPP TS 23.140 V6.14.0 (Nov. 6, 2006), Technical Specification 3rd Generation Partnership Project, Technical Specification Group Core Network and Terminals, Multimedia Messaging Service (MMS), Functional description, Stage 2 (Release 6), http://www.3gpp.org/ftp/Specs/html-info/23140.htm (document http://www.3gpp.org/FTP/Specs/archive/23_series/23.140/23140-6e0.zip).

Xing Su, Tiejun Huang, Wen Gao, "Robust Video Fingerprinting Based on Visual Attention Regions", IEEE International Conference on Acoustics Speech and Signal Processing, available on internet at <http://www.jdl.ac.cn/doc/2009/ROBUST%20VIDEO%20FINGERPRINTING%20BASED%20ON%20VISUAL%20ATTENTION%20REGIONS.pdf>, Apr. 19-24, 2009.

Matthijs Douze, Herv'e J'Egou and Cordelia Schmid, "An Image-Based Approach to Video Copy Detection with Spatio-Temporal Post-Filtering" IEEE Transactions on Multimedia, No. 4, pp. 257-266, available on the internet at <http://lear.inrialpes.fr/pubs/2010/DJS!)/douze_tmm.pdf>, 2010.

\* cited by examiner

SYSTEM AND METHODS FOR EFFICIENT MEDIA DELIVERY USING CACHE

RELATED APPLICATIONS

This application is a Continuation of U.S. application Ser. No. 12/956,114 filed on Nov. 30, 2010, which claims benefit from the U.S. provisional application Ser. No. 61/265,676 filed on Dec. 1, 2009 for "System and Methods for Efficient Media Delivery Using Cache", the entire contents of all applications being incorporated herein by reference.

FIELD OF THE INVENTION

The present invention relates to delivery of media files, and in particular to a system and methods for efficient delivery of media files using cache, including comparing electronic files.

BACKGROUND OF THE INVENTION

Media files, including so-called user generated content (UGC) may be created in a multitude of types of terminals which include user devices such as mobile telephones. Media files may also reside on network servers, and UGC may be uploaded to such servers. One example of a network server storing UGC can be found at www.youtube.com on the Internet. It is possible to access this content with an end user device such as a mobile telephone or a personal computer from almost anywhere in the world. Accessing popular sites holding such content can generate a large amount of network and server traffic. It is therefore desirable to develop methods and system for efficiently carrying or reducing server traffic.

SUMMARY OF THE INVENTION

It is an object of the present invention to provide a system and methods for efficient delivery of remote media files using cache.

It is another object of the invention to provide a system and methods for comparing electronic files, including determining presence of electronic files.

According to one aspect of the invention, there is provided a cache service module, determining a presence of a media file in a cache, the media file being a copy of a remote media file stored at a remote media source, the cache service module comprising:

a file analysis module, comprising a computer readable storage medium having computer readable instructions stored thereon for execution by a processor for:
(i) obtaining, from the remote media source, a file size of the remote media file, and M ranges of bytes, M>=2, at respective offsets relative to the beginning of the remote media file, each range of bytes being shorter than the file size of the remote media file;
(ii) concatenating bytes in the M ranges into a string of bytes;
(iii) generating a signature for the media file using the string of bytes; and
(iv) determining the presence of the media file in the cache, including interrogating the cache with the signature for the media file.

The cache service module further comprises a configuration table, comprising a computer readable storage medium having computer readable instructions stored thereon, for storing a value of M, predetermined parameters respectively defining a number of bytes to be obtained for each range. The configuration table further comprises predetermined parameters for calculating respective offsets as a function of the file size of the remote media file.

In the cache service module described above, preferably one or more of the following conditions is satisfied: the ranges of bytes are not overlapping; the sum of all ranges of bytes is less than the file size of the remote media file; the sum of all ranges of bytes is substantially less than the file size of the remote media file; or one of the offsets is equal to zero.

In the embodiments of the invention, the configuration table further comprises a predetermined threshold for the media file; and the cache service module further comprises a request log module for recording media requests from media client devices for the media file; a comparator for comparing a number of requests stored in the request log for the media file with the predetermined threshold; and a cache interface module for sending the media file to the cache, absent the media file in the cache and provided the predetermined threshold is exceeded. Beneficially, the computer readable instructions for generating the signature comprise computer readable instructions for hashing the string of bytes into a media key, the media key being the signature for the media file.

According to another aspect of the invention, there is provided a system for caching a media file, comprising:
 (a) a cache, comprising a computer readable storage medium, for storing a media file, which is a copy of a remote media file stored at a remote media source;
 (b) a bandwidth optimizing server, including a processor and a computer readable storage medium having computer readable instructions stored thereon, for receiving a request from a media client device for the media file; and
 (c) a cache server, comprising a processor and a computer readable medium having computer readable instructions stored thereon for execution by the processor, the cache server having:
 a cache service module, determining a presence of the media file in the cache, the cache service module comprising a file analysis module for:
(i) obtaining, from the remote media source, a file size of the remote media file, and M ranges of bytes, M>=2, at respective offsets relative to the beginning of the remote media file, each range of bytes being shorter than a file size of the remote media file;
(ii) concatenating bytes in the M ranges into a string of bytes;
(iii) generating a signature for the media file using the string of bytes;
(iv) determining the presence of the media file in the cache, including interrogating the cache with the signature for the media file; and
(v) absent the media file in the cache, obtaining the media file in its entirety from the remote media source and storing the media file in the cache along with the signature.

The system further comprises a network interface module for communicating with the remote media source. The system further comprising a cache interface module for retrieving the media file from the cache and forwarding the media file to the media client device through the bandwidth optimizing server. The bandwidth optimizing server comprises a media transcoder (TRX) module for generating an adapted version of the media file to match the adapted version to a media structure of the media client device.

Beneficially, the request from the media client device includes information regarding the media structure of the media client device.

In the system described above, the cache service module further comprises a configuration table, comprising a computer readable storage medium having computer readable instructions stored thereon, for storing a value of M, and predetermined parameters respectively defining a number of bytes to be obtained for each range. The configuration table further comprises predetermined parameters for calculating respective offsets based on the file size of the remote media file.

In the system of the embodiments of the invention described above, preferably, at least one of the following is satisfied: the ranges of bytes are not overlapping; the sum of all ranges of bytes is less than the file size of the remote media file; the sum of all ranges of bytes is substantially less than the file size of the remote media file; or one of the offsets is equal to zero.

In the system described above, the configuration table further comprises a predetermined threshold for the media file; and the cache service module further comprises: a request log module for recording media requests from media client devices for the media file; a comparator for comparing a number of requests stored in the request log for the media file with the predetermined threshold, and a cache interface module for sending the media file to the cache, absent the media file in the cache and provided the predetermined threshold is exceeded.

In the system described above, the file analysis module is configured to determine the signature for the media file by hashing the string of bytes into a media key, the media key being the signature for the media file.

According to yet another aspect of the invention, there is provided a method for caching a media file, which is a copy of a remote media file stored at a remote media source, the method comprising:

(a) obtaining, from the remote media source, a file size of the remote media file, and M ranges of bytes, M>=2, at respective offsets relative to the beginning of the remote media file, each range of bytes being shorter than a file size of the remote media file;
(b) concatenating bytes in the M ranges into a string of bytes;
(c) generating a signature for the media file using the string of bytes;
(d) determining the presence of the media file in the cache, including interrogating the cache with the signature for the media file; and
(e) absent the media file in the cache, obtaining the media file in its entirety from the remote media source and storing the media file in the cache along with the signature.

The method further comprises generating an adapted version of the media file to match the adapted version to a media structure of a media client device, which has requested the media file.

The method described above further comprises retrieving the media file from the cache and forwarding the media file to the media client device.

In the method described above, the step of obtaining comprises obtaining a value of M, and predetermined parameters respectively defining a number of bytes to be obtained for each range from a configuration table. The step of obtaining further comprises obtaining predetermined parameters from the configuration table for calculating respective offsets based on the file size of the remote media file.

In the method of the embodiments of the invention described above, preferably, at least one of the following is satisfied: the ranges of bytes are not overlapping; the sum of all ranges of bytes is less than the file size of the remote media file; the sum of all ranges of bytes is substantially less than the file size of the remote media file; or one of the offsets is equal to zero.

In the method described above, the step (e) comprises:
 comparing a number of requests stored in a request log for the media file with a predetermined threshold stored in a configuration table; and
 provided the predetermined threshold is exceeded, storing the media file in the cache along said signature.

The method further comprises:
(f) generating an adapted version of the media file to match the adapted version to a media structure of a media client device, which has requested the media file;
(g) comparing a number of requests stored in a request log for the media file with a predetermined threshold stored in a configuration table; and
(h) provided the predetermined threshold is exceeded, storing the adapted media file in the cache along with said signature.

The step (f) further comprising:
(i) recording a type of the requesting media client device in the request log;
(j) comparing a number of requests from the requesting media client device stored in the request log with a predetermined threshold stored in the configuration table;
(j) provided the predetermined threshold is exceeded, generating the adapted version of the media file.

In the method described above, the adapted version is a trans-rated version or a trans-coded version.

In the method described above, the step (c) comprises hashing the string of bytes into a media key, the media key being the signature for the media file.

Thus, an improved system and methods for efficient delivery of media files using cache have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

The embodiments of the invention are aimed at providing a media delivery system and methods, which address the need for reducing the amount of traffic that needs to be carried through a network, including the Internet, by providing an efficient caching mechanism that can be deployed near the end users desiring to download media content from remote servers.

Figure 1:
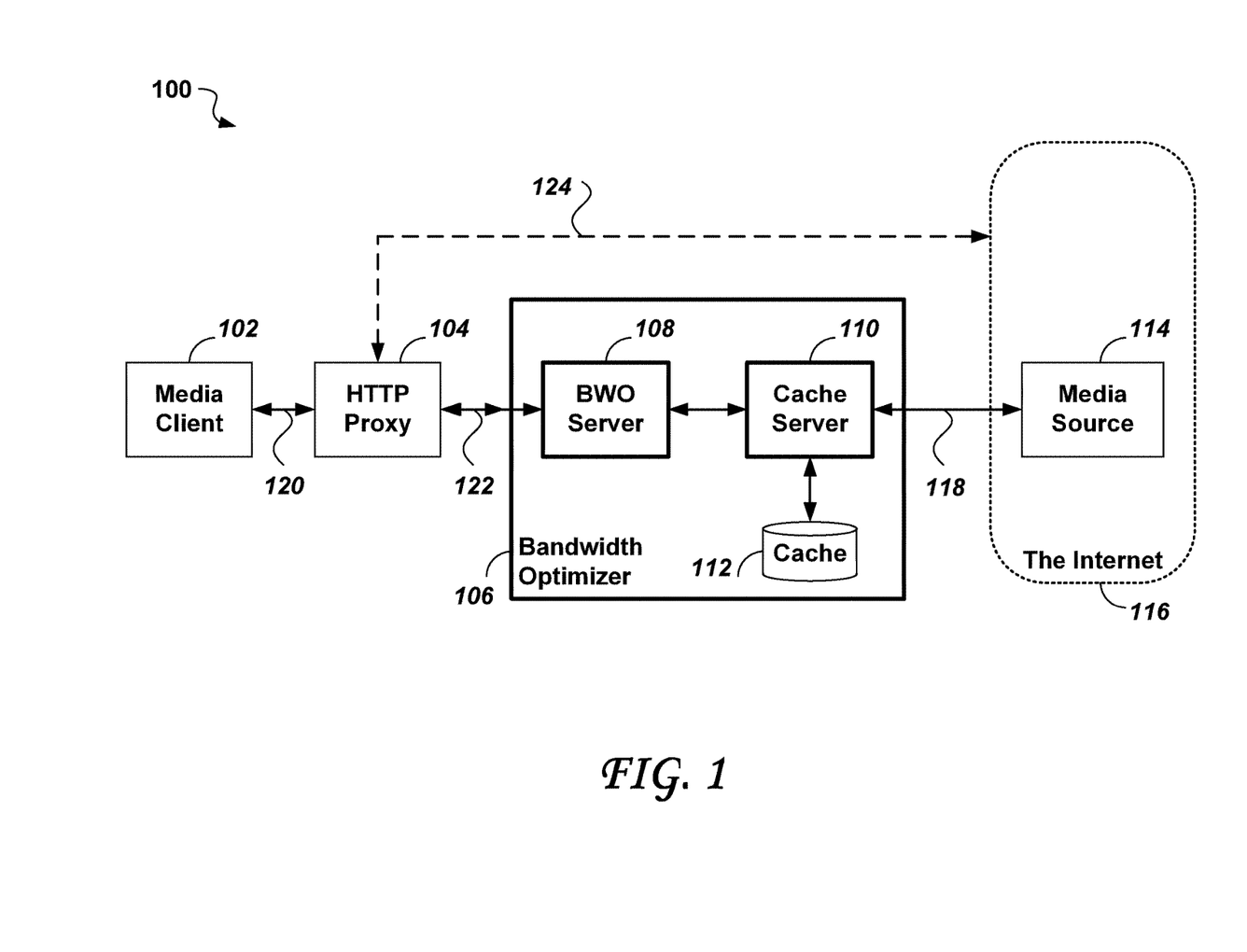
FIG. 1 is a block diagram of a Media Delivery System 100 according to an embodiment of the invention, including a Bandwidth Optimizer 106.

FIG. 1 is a block diagram of a Media Delivery System 100 according to an embodiment of the invention. The Media Delivery System 100 comprises a Media Client device 102; a Hypertext Transfer Protocol (HTTP) Proxy 104; a Bandwidth Optimizer 106 including a Bandwidth Optimizing (BWO) Server computer 108, a Cache Server computer 110, and a Cache memory 112; and a Media Source 114 connected to the Cache Server 110 via the Internet 116. The Media Source 114 may be typically remotely located, and may also be referred to as a Remote Media Source 114.

The BWO Server 108 is a device comprised of computer hardware and software, for example, a general purpose or a specialized computer having a processor and a computer readable storage medium, e.g., computer memory, DVD, CD-ROM or other storage medium, having computer readable instruction stored thereon for execution by the processor for performing functions pertaining to the operation of the BWO Server 108.

The Cache Server 110 is a device comprised of computer hardware and software, for example, a general purpose or a specialized computer having a processor and a computer readable storage medium, e.g., computer memory, DVD, CD-ROM or other storage medium, having computer readable instruction stored thereon for execution by the processor for performing functions pertaining to the operation of the Cache Server 110.

Although only a single Media Client device 102 is shown in FIG. 1, it is understood that the Media Delivery System 100 may contain, and provide service for, a multitude of Internet enabled media client devices, each of which is logically equivalent to the Media Client 102. The term "media client" is intended to be a generic term representing any type of Internet enabled client device such as a Personal Computer (PC), a Personal Digital Assistant (PDA), a smart phone, and a mobile telephone, for example, any of which is capable of receiving media files.

Similarly, the Internet 116 may provide access to numerous Media Sources 114, such as private or public content server computers, including User Generated Content (UGC) Servers, although only one Remote Media Source 114 is shown in FIG. 1.

The Media Client device 102 is connected indirectly to the Media Source 114 by way of: a link 120 between the Media Client 102 and the HTTP Proxy 104; the HTTP Proxy 104 itself; a link 122 between the HTTP Proxy 104 and the BWO Server 108; the BWO Server 108 itself which communicates with the Cache Server 110; the Cache Server 110 itself; and the link 118 between the Cache Server 110 and the Media Source 114. A purpose of the Bandwidth Optimizer 106 is to conserve bandwidth usage on the link 118 which may be very long or costly to use, by caching media files in the Cache 112, which is coupled to the Cache Server 110.

A further function provided by the Bandwidth Optimizer 106 is to control the rate of media transmissions on the link 120 which may have a bandwidth limitation as may the link 122 and to match the capabilities of the Media Client 102. Preferably, the Bandwidth Optimizer 106 optionally adapts the media file to the device characteristics of the Media Client 102.

When bandwidth optimization or adaptation are not required, the HTTP Proxy 104 may access the Internet 116 directly over a link 124, bypassing the Bandwidth Optimizer 106.

Figure 2:
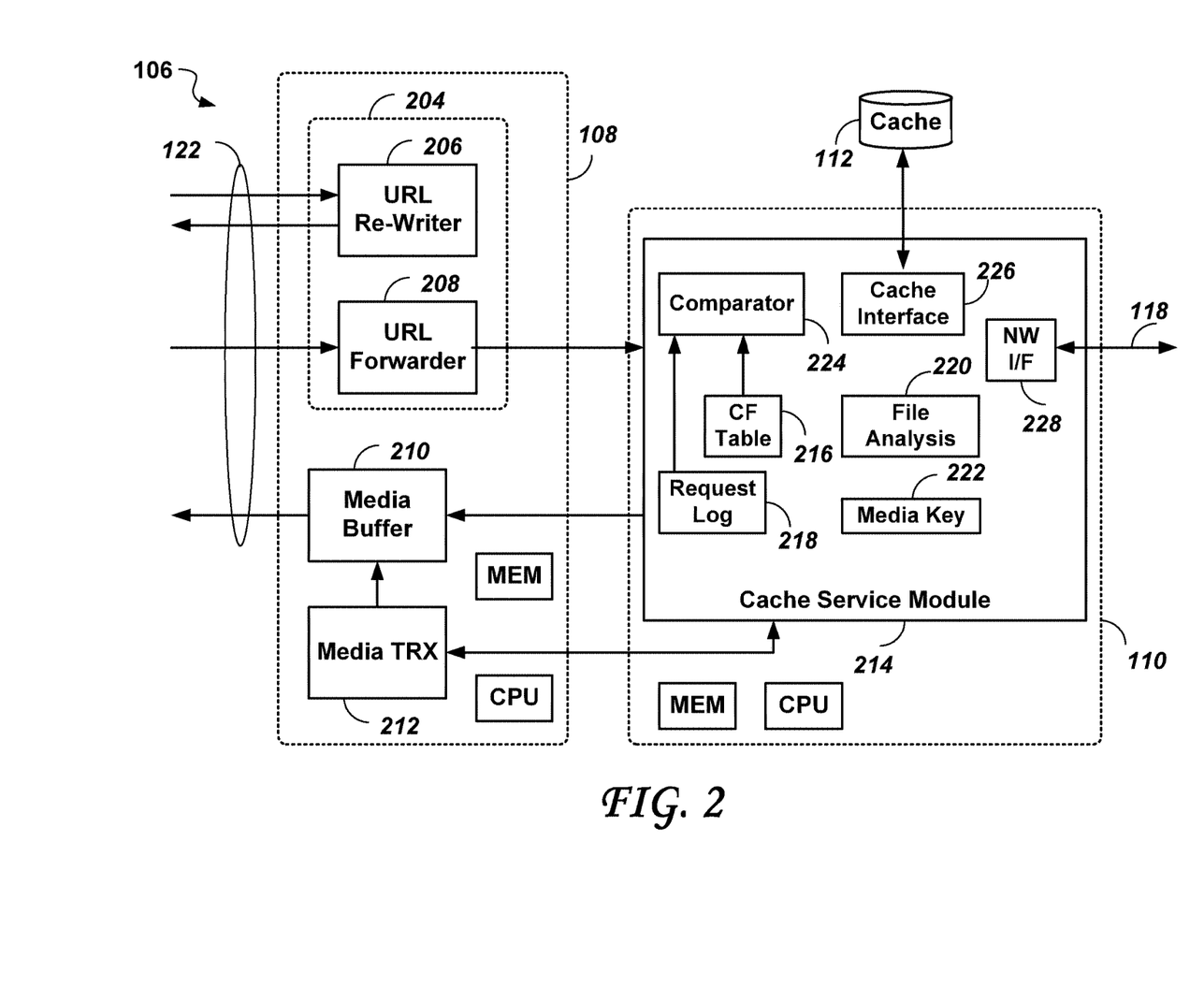
FIG. 2 is a simple expanded block diagram of the Bandwidth Optimizer 106 of FIG. 1.

FIG. 2 is a simple expanded block diagram of the Bandwidth Optimizer 106 including the BWO Server 108 comprising a BWO Gateway 204 including a Universal Resource Locator (URL) Re-Writer Module 206 and a URL Forwarder Module 208; a Media Buffer Module 210; and a Media Transcoder (TRX) Module 212. The Bandwidth Optimizer 106 further comprises the Cache 112 coupled to the Cache Server 110 which includes a Cache Service Module 214. The Cache Service Module 214 comprises a computer readable medium having computer readable instructions stored thereon for execution by a processor, for performing processing tasks of obtaining media files from the Media Source 114, communicating with the Cache 112 for storing and retrieving media files, receiving media requests from the BWO Server 108, and transmitting media files retrieved from the Cache 112 to the BWO Server 108.

Both the BWO Server 108 and the Cache Server 110 are implemented in computer hardware including a computer readable storage medium, for example one or more Memory Units (MEM), and one or more Central Processing Units (CPU), the Modules 206-214 being software modules, having computer readable instructions stored in a computer readable medium, e.g. respective MEMs, and executed in respective CPUs. Functional and software modules of the BWO Server 108 and the Cache Server 110 comprise computer readable instructions, stored in the respective computer readable storage media, and executed in the respective CPUs. Without loss of generality, the BWO Server 108 and the Cache Server 110 may be realized as separate computers, or as a single computer. The Cache 112 is a hardware component, which may be conventionally implemented in a hard disk or other memory technology as convenient, including a hierarchy of cache memory components and any of a conventional data base software useful for storing files and associated file keys.

The Cache Service Module 214 is a software module having computer readable instructions stored in a computer readable storage medium of the Cache Server 110, e.g., computer memory, DVD, CD-ROM or other storage medium. The Cache Service Module 214 is adapted for communicating with the Media Source 114 and the BWO Server 108 for receiving and sending media files and for storing these media files in the Cache 112 as well as retrieving them from the Cache 112. The Cache Service Module 214 is further equipped with a Configuration Table 216 for configuring programmable predetermined parameters to control caching and a Request Log Module 218 in which details of media requests are logged. In addition, the Cache Service Module 214 includes a File Analysis Module 220 for collecting selected parts (ranges of bytes) of the remote media file and generating a file signature of the remote media file, also referred to as a Media Key 222. The Cache Service Module 214 further includes a Comparator 224 for comparing the number of requests logged in the Request Log Module 218 for a given media file with a caching threshold stored in the Configuration Table 216. The Cache Service Module 214 also includes a Cache Interface Module 226 for communicating with the Cache 112, and a Network Interface Module (NW I/F) 228 for communicating with the Media Source 114.

To provide a context of the Media Delivery System 100, an example system operation is first described in general.

When the Media Client 102 (FIG. 1) requests a remote media file of the Media Source 114, it sends a request, including a target URL targeting the Media Source 114, to the HTTP Proxy 104 over the link 120. The HTTP Proxy 104, after evaluating the target URL, may conventionally obtain the remote media file directly over the link 124. However, if it is indicated in the HTTP Proxy 104 that the remote media requires optimizing, the target URL may be sent by the HTTP Proxy 104 to the URL Re-Writer Module 206 in the BWO Server 108 which re-writes the target URL which may also be a symbolic or a group URL, into a Bandwidth Optimized URL (BWO URL). The BWO URL includes the address of the Bandwidth Optimizer 106 and, in the form of a parameter, the actual URL of the Media Source 114 and the complete path of the requested remote media file on the Media Source 114. The BWO URL is returned through the HTTP Proxy 104 to the Media Client 102 which may then reformulate the request using the BWO URL and resend it.

As described in FIG. 1, the HTTP Proxy 104 and the Bandwidth Optimizer 106 are generally two distinct subsystems, linked by the link 122, allowing the two subsystems to be in different physical locations, or be administered by different commercial entities. Where appropriate, the functions of the HTTP Proxy 104 could also be included in the BWO Server 108 which may result in a number of simplifications.

The BWO URL is sent from the Media Client 102 to the HTTP Proxy 104 from which, through the URL Forwarder Module 208 of the BWO Server 108, the BWO URL is forwarded to the Cache Service Module 214. The Cache Service Module 214 determines by the inventive methods described below, whether a copy of the remote media file already exists in the Cache 112. If it does exists, the Cache Service Module 214 sends the cached remote media file to the Media Client 102 through the Media Buffer Module 210 of the BWO Server 108 and, over the link 122, through the HTTP Proxy 104.

The remote media file or its cached copy may need to be adapted to meet requirements of the Media Client 102 in which case the Media TRX Module 212 is invoked to provide the necessary adaptation function. An adapted version of the remote media file may also already exist in the cache, in which case the Media TRX Module 212 is bypassed. The adapted version may be a trans-coded version to match the media structure of the specific device type of the Media Client 102, or it may simply be a trans-rated version in which the media was only re-encoded to reduce the bit rate without changing the media structure.

The media structure for trans-coding may be deduced from information included in the request from the Media Client 102, for example through a table included in the Configuration Table 216 listing media structures against common device types. Requests for adapted and transrated versions may be logged in the Request Log 218, not only including information regarding the targetted media file of the request, but also regarding the type of device of the requesting media client. Thresholds stored in the Configuration Table 216 may be used for determining when a trans-rated or a trans-coded version should be generated in response to a request. A trans-rated version may be generated when complete information regarding the media structure of the requesting device type is not available, and only a limit for a bit rate to the device is available. A trans-coded version may be generated only when the treshold regarding requests from a particular device for a particular media file is exceeded.

In a trans-coded version for example the frame rate or the X and Y dimensions of the media have been changed to accommodate the receiving device (the Media Client 102). One practical way of transcoding media files has been described in the US patent application of Stephane Coulombe Ser. No. 12/164,836 filed on Jun. 30, 2008 for "System And Method For Quality-Aware Selection of Parameters In Transcoding of Digital Images", the entire contents of which are incorporated herein by reference.

Figure 3:
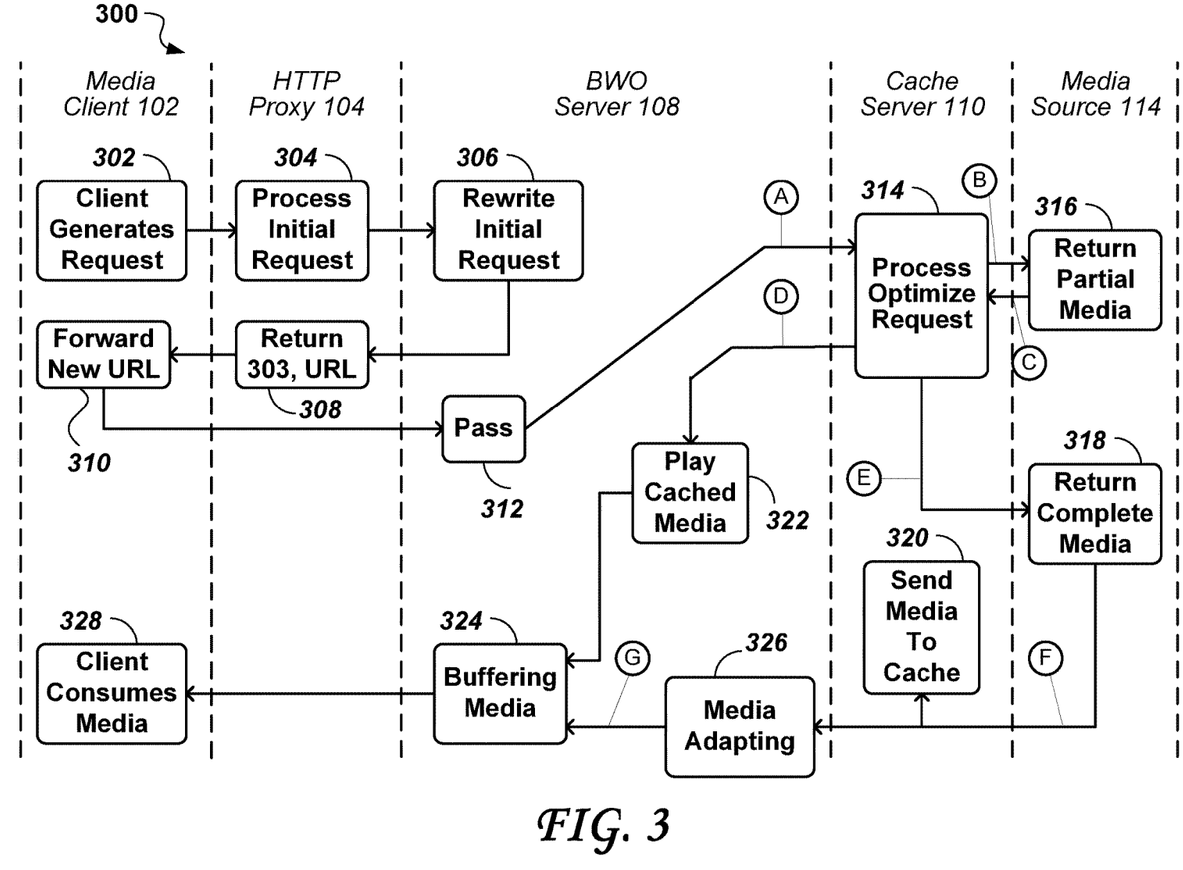
FIG. 3 is a function diagram 300 showing functions executed in components of the Media Delivery System 100 of FIG. 1.

FIG. 3 is a function diagram 300 showing an exemplary sequence of functions executed in components of the Media Delivery System 100 as a result of a media request by the Media Client 102. The functions are linked with arrows indicating the sequence of execution in a typical case.

The names of the components of the Media Delivery System 100 are listed in italics along the top of the chart, separated by dashed vertical lines.

The sequence starts in a function 302 "Client Generates Request" in the Media Client 102. The request, which includes an initial target URL, is received and processed in the HTTP Proxy 104 in a function 304 "Process Initial Request".

Having decided that this request should be optimized, the HTTP Proxy 104 forwards the request to the BWO Server 108 where its initial target URL is rewritten by the URL Re-Writer Module 206 in a function 306 "Redirect Initial Request". Here the initial target URL is converted into the BWO URL.

A return code "303" indicating "REDIRECT" along with the BWO URL are then returned to the HTTP Proxy 104 where the BWO URL, along with the return code "303" may be repackaged into a protocol data unit in a protocol function 308 "Return 303, URL" and sent back to the Media Client 102.

The traffic between the HTTP Proxy 104 and the BWO Server 108 may include URL re-writing in the BWO Server 108 as shown in FIG. 3. Alternatively, the initial request from the Media Client 102 may also be transparently proxied (i.e. the BWO URL substituted) by the HTTP Proxy 104 to the BWO Server 108, without involving the URL Re-Writer Module 206 of the BWO Server 108.

The Media Client 102 sends the initial request (Client Generates Request) containing the target URL that targets a media file in the Internet. The HTTP Proxy 104 is provisioned with rules to decide which Domain URLs should be sent to the URL Re-Writer Module 206 or directly and transparently forwarded to the BWO Server 108. The HTTP Proxy function may also include other functions that are outside the scope of the present invention. Communication with the Media Client 102 would typically be with HTTP, but communication between the HTTP Proxy 104 and the BWO Server 108 may also be based on the Internet Content Adaptation Protocol (ICAP) which is a lightweight HTTP based protocol, designed for proxy/server interaction and specified in Recommendation for Comment (RFC) 3507 of the Internet Engineering Task Force (IETF).

The BWO Server 108 may thus implement an ICAP server for handling directly forwarded requests or generating the BWO URL in the function 306 (Redirect Initial Request) as shown in FIG. 3. In the BWO Server 108, the ICAP encapsulated initial request that includes the initial target URL is analyzed. The initial target URL, such as a published URL or a group URL, may also be interpreted to retrieve an actual URL of a service or device that can provide the requested media. The actual URL is converted to the BWO URL, and a HTTP redirect command is returned to the HTTP Proxy 104 which, using the protocol function 308 (Return 303, URL), returns the BWO URL to the Media Client 102.

The method using ICAP described briefly here is merely an example for communication between the HTTP Proxy 104 and the BWO Server 108, other methods may also be used such as simple transparent proxying.

In a re-request function 310 "Forward New URL", the Media Client 102 recognizes the redirection command and proceeds to now send an "optimized" request to the BWO Server 108 using the BWO URL, the optimized request including as a parameter the actual URL that is pointing to the media file on the Media Source 114.

Figure 4:
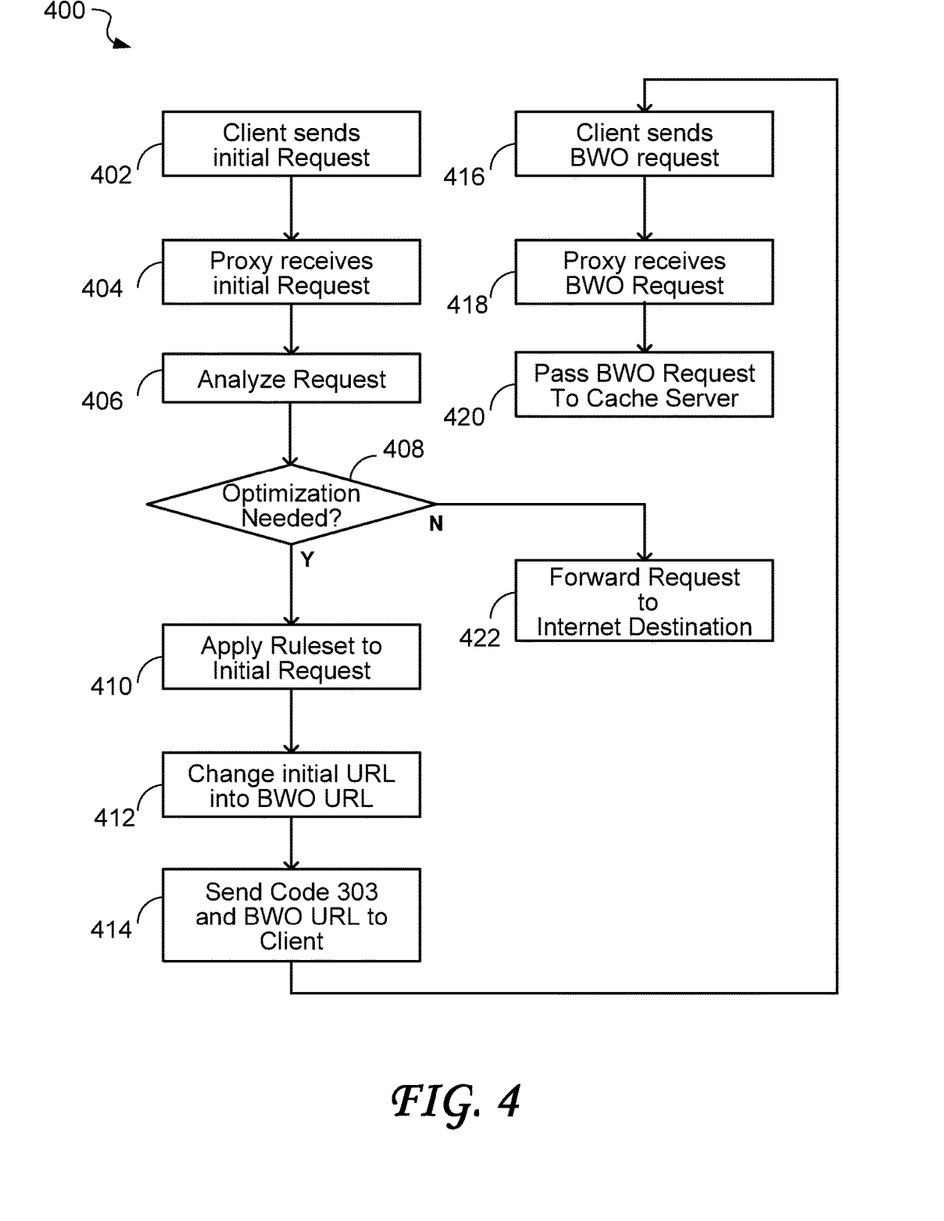
FIG. 4 is an expansion of the function module 314 "Process Optimize Request" of FIG. 3.

FIG. 4 shows a summarizing flowchart illustrating steps of an exemplary interaction 400 between the Media Client 102, the HTTP Proxy 104, and the BWO Server 108, including steps:

402 "Client sends initial Request";
404 "Proxy receives initial Request";
406 "Analyze Request";
408 "Optimization Needed?";
410 "Apply Ruleset to initial Request";
412 "Change initial URL into BWO URL";
414 "Send Code 303 and BWO URL to Client";
416 "Client sends BWO Request";
418 "Proxy receives BWO Request";
420 "Pass BWO Request to Cache Server";
422 "Forward Request to Internet Destination".

In the step 402 "Client sends initial Request", the Media Client 102 sends the initial request for a media file to the HTTP Proxy 104.

In the step 404 "Proxy receives initial Request", the HTTP Proxy 104 receives the initial request from the Media Client 102.

In the step 406 "Analyze Request", the HTTP Proxy 104 analyzes the URL contained in the request to determine the correct URL of the Media Source 114 and the path to the requested remote media file.

In the step 408 "Optimization Needed?" the HTTP Proxy 104 determines if the URL of the request refers to a media file that may need to be optimized.

If optimizing is not required ("N" from step 408), execution proceeds to the step 422 "Forward Request to Internet Destination", otherwise ("Y" from step 408) execution passes to the step 410 "Apply Ruleset to initial Request".

The step 408 "Optimization Needed?" filters requests for other types of traffic, including media requests that cannot be optimized by the BW Optimizer 106, and such requests are directly forwarded to the requested internet destination in the step 422 "Forward Request to Internet Destination" over the link 124 (FIG. 1), thereby bypassing the BW Optimizer 106.

In the step 410 "Apply Ruleset to initial Request", a configured ruleset is applied against the URL of the initial request. This process yields the BWO URL described earlier.

In the step 412 "Change initial URL into BWO URL", a redirect message is generated in which the initial target URL is replaced with the BWO URL.

As shown in FIG. 3, the steps 410 and 412 are preferably performed in the function 306 (Redirect Initial Request) of the BWO Server 108. Alternatively, the function 306 may also be located in the HTTP Proxy 104.

In the step 414 "Send Code 303 and BWO URL to Client", the redirect message comprising a URL redirect code 303 and the BWO URL is sent to the Media Client 102.

In the step 416 "Client sends BWO Request", the Media Client 102 replaces the URL of the initial request with the BWO URL to generate a modified request, that is the Bandwidth Optimized (BWO) request, and sends the BWO request to the HTTP Proxy 104.

In the step 418 "Proxy receives BWO Request", the HTTP Proxy 104 receives the BWO request and passes it directly to the BWO Server 108.

In the step 420 "Pass BWO Request to Cache Server", the BWO Server 108 passes the BWO Request directly to the Cache Server 110 where the actual optimization takes place (see FIG. 5, below).

As an example, the following is a simple flow:
The Media Client 102 sends a HTTP GET request to URL http://lscache6.youtube.com/videoplayback (step 402);
The HTTP Proxy 104 receives the request and applies a configured ruleset against the request URL (step 410); note that the ruleset for a Youtube video request may be expressed as a regular expression of the form "*.youtube.com/videoplayback*" which matches the request URL;
The HTTP Proxy 104 sends a HTTP 303 Redirect response to the Media Client 102 (step 414) with the Location header pointing to the bandwidth optimizer (the BWO Server 108) followed by a parameter comprising the initial URL, e.g. http://optmizer.vatrix.com/?url=ls6ache.youtube.com %2Fvideoplayback.

In functional terms, the URL Forwarder 208 of the BWO Server 108 receives the optimized and redirected request in a function 312 "Pass" and passes it to the Cache Service Module 214 of the Cache Server 110 for processing in a function module 314 "Process Optimize Request".

Figure 5:
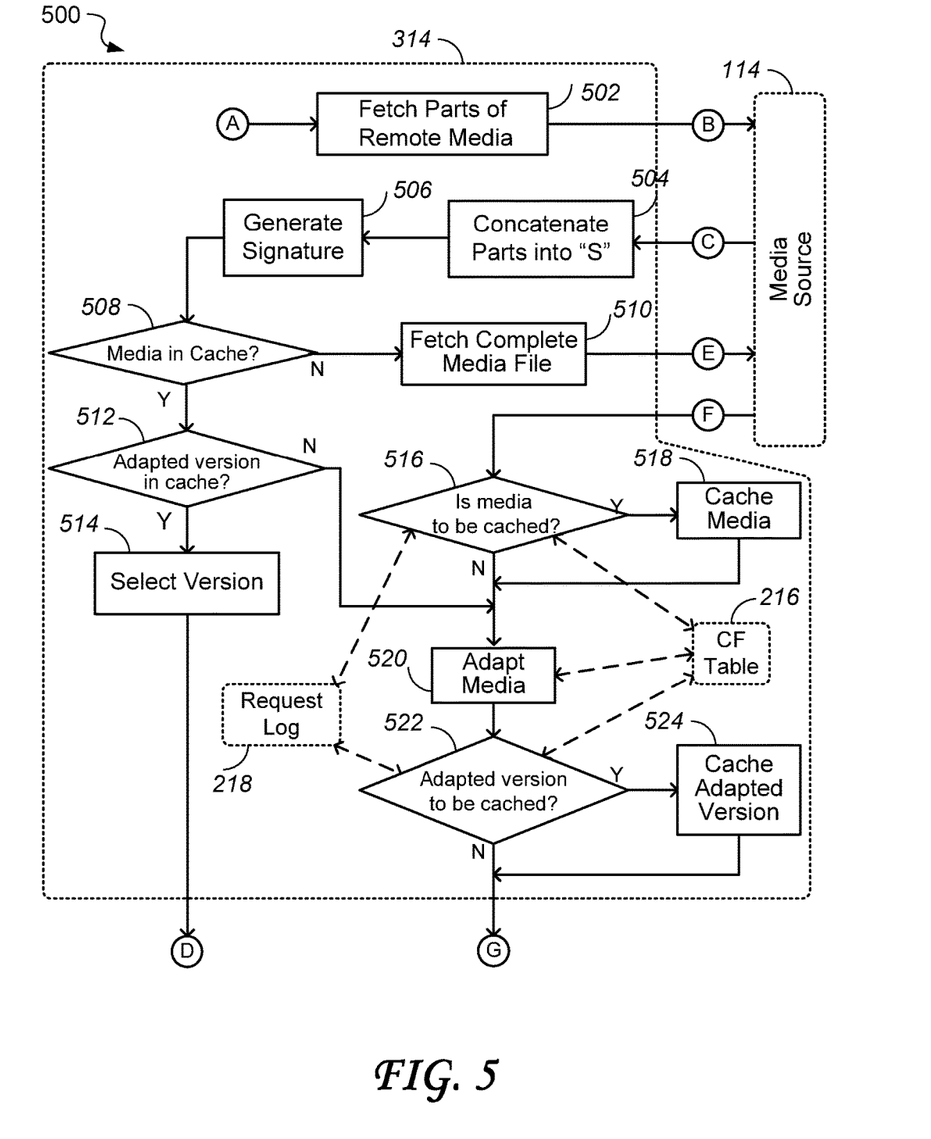
FIG. 5 is a flowchart 500 showing the functionality of the function module 314 "Process Optimize Request" of FIG. 3.

FIG. 3 shows additional function modules:
316 "Return Partial Media";
318 "Return Complete Media";
320 "Send Media to Cache";
322 "Play Cached Media";
324 "Buffering Media";
326 "Adapting Media"; and
328 "Client Consumes Media",
which will be more readily understood after the function module 314 "Process Optimize Request" has been more fully described with the aid of FIG. 5 following.

FIG. 5 is a flowchart 500 showing the functionality of the function module 314 "Process Optimize Request" showing high level steps for obtaining a cached version of the requested media if such a version exists, and steps to otherwise obtain the remote file and cache it, including the following steps:

502 "Fetch Parts of Remote Media";
504 "Concatenate Parts into String 'S'";
506 "Generate Signature";
508 "Is Media in Cache?";
510 "Fetch Complete Media File";
512 "Is Adapted Version in Cache?";
514 "Select Version";
516 "Is media to be cached?";
518 "Cache Media";
520 "Adapt Media";
522 "Is Adapted Version to be cached?"; and
524 "Cache adapted version".

In the step 502 "Fetch Parts of Remote Media", the Cache Service Module 214 receives the BWO request (label "A") and communicates (label "B") with the Media Source 114 to obtain selected portions of the remote media file that is identified in the BWO request. The selected portions are extracted from the remote media file by the function 316

"Return Partial Media" (FIG. 3) of the Media Source 114 and sent to the function module 314 "Process Optimize Request" to be received and processed in the step 504 "Concatenate Parts into String 'S'".

The retrieval process of the step 502 "Fetch Parts of Remote Media" may use a series of HTTP GET requests that include a Range header, which allows a HTTP client (i.e. the Cache Server 110) to determine the size (Content Length CL) of the remote file, and then request specific ranges of bytes from a HTTP server (the Media Source 114). The responses will contain only the requested bytes and include a Content-Length header indicating the total length of the remote media file.

The step 502 "Fetch Parts of Remote Media" may be summarized as a simple flow:

Send a first request for an initial range of bytes at the start of the media file;
Retrieve bytes and process response headers to obtain the Content-Length header;
Determine subsequent ranges of bytes to request, based on configuration and Content-Length "CL";
Perform subsequent byte range requests until all required bytes of the selected file portions are retrieved.

Figure 6:
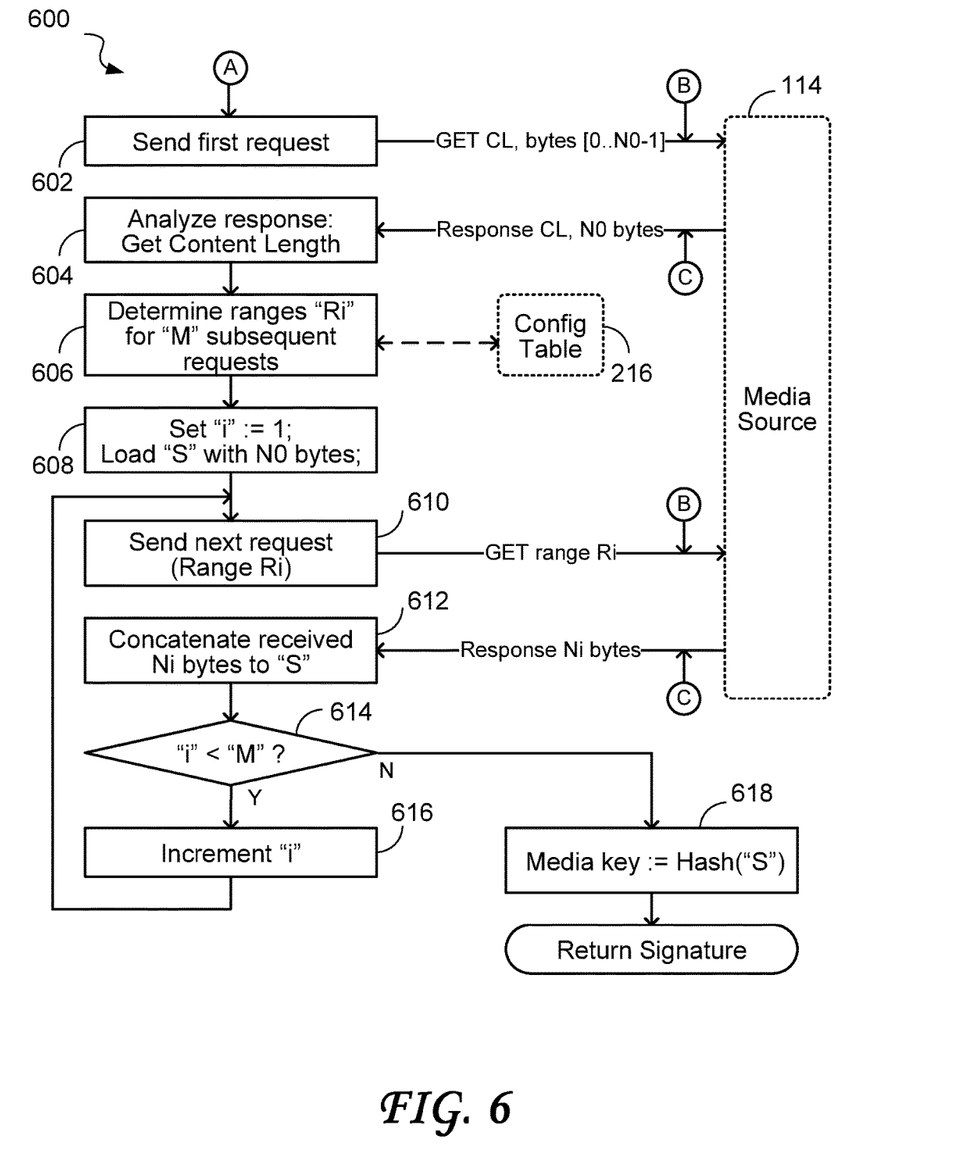
FIG. 6 shows a flow chart 600 that illustrates exemplary details of the steps 502 "Fetch Parts of Remote Media", 504 "Concatenate Parts into String 'S'", and 506 "Generate Signature", of FIG. 5.

FIG. 6 shows a flow chart 600 that illustrates exemplary details of the steps 502 "Fetch Parts of Remote Media", 504 "Concatenate Parts into String 'S'", and 506 "Generate Signature", including steps:

602: "Send first request";
604: "Analyze Response: Get Content Length";
606: "Determine ranges and offsets for 'M' subsequent requests";
608: "Set 'i':=1; Load 'S' with N0 bytes";
610: "Send next request (Range $R_i$)";
612: "Concatenate received $N_i$ bytes to 'S'";
614: "Is 'i' less than 'M'";
616: "Increment 'i'"; and
618: "Media key:=Hash('S')".

In the step 602: "Send first request", entered at label (A) (see FIGS. 3 and 5), a first HTTP GET request is sent to the Media Source 114, requesting the Content Length (size of the entire remote media file), and optionally a first range of N0 bytes from the start of the remote media file, i.e. range=0 to N0−1. The value of N0 may be fixed or may be obtained from the Configuration Table 216. The first and subsequent GET requests are labeled (B), see also FIGS. 3 and 5.

In the step 604: "Analyze Response: Get Content Length", the response to the first HTTP GET request, a partial response message, is received and analyzed. This includes the Content Length, indicating the size of the file and, if requested, the first range of N0 bytes. This and subsequent response messages are labeled (C), see also FIGS. 3 and 5.

In the step 606: "Determine ranges 'Ri' for 'M' subsequent requests", the number of subsequent requests and their byte ranges are determined based on configured predetermined parameters. Predetermined parameters for determining a number of ranges, the size of each range, and a rule for determining the location of each range within the remote file, are preferably specified in the Configuration Table 216. For example, in addition to the first range of N0 bytes at offset 0 (of the first request, step 602), a predetermined number "M" of subsequent ranges may be specified, each of the subsequent ranges having a length of "$N_i$" bytes, and starting at predetermined offsets in the file. The first range of bytes, and the number "M" of (subsequent) ranges of bytes may alternatively be combined into a single number "M" of ranges, that is, "M" would include all ranges including the first range at offset 0. The reason, the first range of N0 bytes has been defined separately is, because the first request (step 602) is required to at least obtain the Content Length, but it is optional to also obtain a range of bytes from the beginning of the file at the same time (see rationale below).

The offsets may be specified as proportions "$F_i$" (i=1 to M) of the Content-Length (CL) of the remote media file. Thus, locations of subsequent ranges may be computed as $R_i=[CL*F_i \ldots CL*F_i+N_i-1]$. Other methods of determining the file locations of the subsequent ranges are also possible, for example a smaller or larger number of subsequent requests may be dynamically defined, depending on the actual Content Length. The sizes chosen for the individual subsequent ranges may be variable, i.e. defined in the variable number "$N_i$" of bytes in successive ranges, or a fixed number of "N" bytes may be specified for each range. It is understood that other rules for determining ranges may be easily envisaged within the scope of the invention.

The ranges of bytes constitute in effect discrete samples from the bytes of the complete remote media file. In order to significantly reduce the network traffic to the Remote Media Source 114, the sum of the number of bytes "$N_i$" in all "M" ranges plus the first range of N0 bytes are should be preferably less than the number of bytes of the complete remote media file in its entirety, and yet further preferably substantially less, for example less than 1%. Nevertheless, when the remote media file is short it may occur that the selected ranges actually overlap, but normally the size of remote media file is much larger than the number of bytes in all selected ranges, the offset factors ensure the ranges are spread over the length of the file, and preferably no overlap would occur.

The following is a very simple example of a set of configured parameters stored in the Configuration Table 216: N0=256, M=3, N (fixed)=1024, and $F_i$=¼, ½ and ¾ for i=1 to 3. With this arrangement, any media file of a length of at least 4096 bytes will yield four representative ranges totaling 256+3*1024=3328 bytes without overlap for subsequent concatenation (step 612) and hashing (step 618). With the same parameters, a typical media file of 1 Megabyte would yield a set of ranges totaling 0.33% of the size of the media file, i.e. a 300-fold reduction in network traffic compared to downloading the entire file.

Although a practical example of the number "M" of ranges, their individual lengths "$N_i$" (i=0 to M), and their locations within the remote media file given by the proportions "$F_i$", has been provided, it is understood that these values are programmable through the Configuration Table 216 and different values may be chosen.

In the step 608: "Set 'i':=1; Load 'S' with N0 bytes", a string "S" is loaded with the optional N0 bytes received in the response to the first request, and an index variable "i" is set to one (1).

The steps 610 to 616 constitute a loop for sending "M" subsequent requests and processing the responses. Using a loop construct here allows "M" to be easily modified dynamically or by configuration.

In the step 610: "Send next request (Range $R_i$)", a HTTP GET request is sent to the Media Source 114, requesting the range $R_i$ comprising $N_i$ bytes.

In the step 612: "Concatenate received $N_i$ bytes to 'S'", the $N_i$ bytes received in the response from the Media Source 114 are concatenated with the string "S".

In the step 614: "Is 'i' less than 'M'", the index variable "i" is compared with the previously determined number "M" of subsequent requests. If all "M" subsequent ranges have been received (exit "N" from step 614) the loop is exited and the step 618: "Media key:=Hash('S')" follows next, otherwise looping continues with the next step 616: "Increment 'i'" in which the index variable "i" is incremented, and the loop is reentered at the step 610 "Send next request (Range $R_i$)".

In the step 618: "Media key:=Hash('S')", the string "S" now including the accumulated bytes from all "M" ranges as well as the N0 bytes from the first request, is hashed into the media key 222.

A rationale for obtaining a hashed file signature (the media key) from only a few segments, i.e. defined ranges or subranges of bytes of the media file instead of a signature derived from the entire file is as follows.

The BWO URL identifies the remote media file. Two factors make it important to reduce the traffic to the Media Source 114: the remote media file may be large, and the Media Source 114 may be located at a certain, possibly great, geographical distance from the Bandwidth Optimizer 106 and the Media Client 102. The general objective of the invention is to avoid retrieving the complete file from the Media Source 114 if it is already in the Cache 112. Because the BWO URL may have changed from the URL when the file was previously downloaded and cached, or multiple copies of the remote media file may exist under different URLs, the Cache Server 110 cannot rely just on comparing the BWO URL with cached URLs to determine if a cached version of the remote media file already exists in the cache.

To solve this problem according to embodiments of the invention, the Cache Server 110 initially obtains only the representative string "S" of bytes from a defined number of small portions of the remote media file from the Media Source 114 as described above.

The reader's attention is now directed back to FIG. 5.

As described above, in the step 506 "Generate Signature", the Cache Server 110 hashes the string "S" into a file signature, also referred to as a "media key", for comparison with file signatures already in the cache. The signature is used as a file key into the cache, which may be, constructed according to conventional database principles. If the file key is found in the cache, this implies that (a copy of) the remote media file is stored in the cache.

The steps 502 to 524 are performed in modules of the BWO Server 108 and the Cache Server 110. Specifically, the steps 502, 504, 506, and 524 are performed in the File Analysis Module 220 of the Cache Service Module 214, thus generating the Media Key 222. The steps 508, 510, 518 and 524 involve the Cache Interface Module 226. The step 520 is performed in the Media TRX Module 212 of the BWO Server 108. The steps 516 and 522 are performed in the Comparator 224 of the Cache Service Module 214, and the steps 502, 504, and 510 involve use of the Network Interface Module 228.

It is known that caching methods based on hashes of contents are not 100% perfect, and a small probability exists that different contents may be hashed into identical signatures which could result in retrieving an incorrect file from the cache. The probability of such a false positive can be made vanishingly small by means of the choice of hashing function and the bit-size of the hashed signature. In the present case, an additional variable exists, namely the nature and the size of the part of the media file selected for hashing into the signature. To ensure a vanishingly small failure rate of retrieving an incorrect file from the cache because its signature matches a different file, the inventors propose to use retrieval of byte segments from multiple locations, that is predefined distinct byte ranges in the file instead of only using a segment from the start of the file, for example. Using only the starting segment could lead to a high level of false positives, for example with a movie file because all movies from the same movie maker could start with the same introduction. A prototype system of the embodiments of the invention has been successfully evaluated using three retrieval points, at the 25%, the 50% and the 75% locations respectively of the file.

The signature is generated in the step 506 "Generate Signature" by hashing the portions of the remote media file that were sent by the Media Source 114, that is the byte sequence of the string "S" that was concatenated from the individual ranges of bytes retrieved in the step 502 and stored in the memory of the Cache Server 110. The Message-Digest algorithm number 5 (MD5) is a widely used cryptographic hash function for generating a 128-bit hash value that has been used as a file signature, also referred to as signature for a media file, in the embodiments of the invention. MD5 is specified in Recommendation for Comment (RFC) 1321 of the Internet Engineering Task Force (IETF). MD5 is a valid cryptographic hash function for implementing the step 506. Alternatively, any other cryptographic hash function may be used provided it is sufficiently robust. A list of suitable cryptographic hash functions of various complexity and efficiency is provided in a table in <http://en.wikipedia.org/wiki/Cryptographic_hash_function>, including hash functions commonly known as "GOST", "HAVAL", "PANAMA", "SHA-0", and others.

In the step 508 "Media in Cache?", the Cache 112 is accessed and interrogated with the signature or media key to determine if the requested remote media file is in the Cache 112.

If the media is not found in the Cache 112 (exit "N" from the step 508), a return code of "not found" is sent back from the Cache 112 to the Cache Server 108 which then proceeds in a step 510 "Fetch Complete Media File" to fetch the complete remote media file from the Media Source 114 (label "E"). After the complete remote media file is sent by the function 318 "Return Complete Media" of the Media Source 114 (label "F") and received in the Cache Server 108, it is forwarded to the BWO Server 108.

In the step 516 "Is media to be cached?", the Configuration Table 216 of the Cache Server 108 is consulted to determine whether the media should be cached. The Configuration Table 216 includes a programmable rule to determine if the retrieved complete remote media file should be cached. For example, a rule for caching could be to log all media requests in the Request Log 218 of the Cache Server 110, and to cache the remote media file only when its request rate is sufficiently high, that is if it reaches a certain threshold.

The step 518 "Cache Media" is performed in the function 320 "Send Media to Cache" of the Cache Service Module 214, and the complete media is sent to the Cache 112 and stored against the media key (signature) determined earlier in the step 506 "Generate Signature".

Whether or not the media file is cached, that is, following the step 518 "Cache Media", or following the exit "N" from the step 516 "Is media to be cached?", execution continues with the step 520 "Adapt Media", described below.

If the remote media file had already been found in the Cache 112 (exit "Y" from the step 508), there is a possibility that a specific adapted version, i.e. a version suitably adapted for the characteristics of the requesting device, i.e. the Media Client 102, also already exists in the Cache 112. As described earlier, the adapted version may be a trans-rated version or a trans-coded version.

In the step 512 "Is Adapted Version in Cache?", it is determined whether a suitably adapted version is in the Cache 112. If such an adapted version exists, or if an adapted version is unnecessary because the original (full) media file can be sent to the Media Client 102 (exit "Y" from step 512), a pointer to the appropriate version in the Cache 112 is selected in the step 514 "Select Version" and forwarded (label "D") to the function 322 "Play Cached Media" of the BWO Server 108.

If a suitable adapted version does not exist in the Cache 112 (exit "N" from step 512), the media file may be adapted, i.e. either trans-rated or trans-rated in the step 520 "Adapt Media", performed in the function 326 "Adapting Media" (FIG. 3, label "G") which is executed in the TRX Module 212 of FIG. 2.

Adapted versions are generated from an original cached version when their request rate is sufficiently high, that is if it reaches a certain threshold. The threshold may be configured in the Configuration Table 216. Requests may be tracked globally for all types of Media Client devices, or for specific subsets of devices. The device type is identified from the header in the media BWO request from the Media Client 102. The global threshold would trigger trans-rating while a device-specific threshold would trigger trans-coding.

Both trans-rated and trans-coded versions that are created in the step 520 "Adapt Media" may be kept in the cache, as determined in the step 522 "Is Adapted Version to be cached?" in which the Request Log 218 and the Configuration Table 216 are consulted.

In the step 524 "Cache adapted version", the adapted version is sent to the Cache 112 using the previously computed media key.

The version of the media file that was already found in the Cache 112 is indicated with a pointer in the step 514 "Select Version" and sent with a "redirect" return code (label "D") to the BWO Server 108 which then sends the identified cached media file in the function 322 "Play Cached Media" through the Media Buffer 210 which performs the buffering function 324 "Buffering Media", to the Media Client 102.

Whether or not the adapted version of the media file is cached, that is, following the step 524 "Cache Adapted Version", or the exit "N" from the step 522 "Is adapted version to be cached?", the identified media file is then forwarded (label "G") to the Media Buffer 210 which performs the buffering function 324 "Buffering Media", and on to the Media Client 102.

The Media Client 102 now finally receives and consumes (displays or otherwise uses) the requested media file in its function 328 "Client Consumes Media".

The purpose of the Media Buffer Module 210 in the BWO Server is to regulate transmission of the media file from the BWO Server 108 to the Media Client 102 in order to adjust a media delivery rate according to configured policies or based on properties of the media itself (e.g. media bit rate).

The retrieval of concatenated parts, i.e. isolated byte ranges, of the media file and their hashing into a single media key has been described with exemplary embodiments. The embodiments of the invention propose these bandwidth-efficient methods in order to efficiently determine whether a cache copy of the file already exists in the Bandwidth Optimizer 106. Rules whether or not to cache a file at all may be variously defined and configured, examples having been provided. For example, one may cache only the signature on a first encounter, and cache the complete file on the second encounter within a certain time. Identical or different rules may be applied for caching the unmodified (complete) file, and for caching adapted versions.

It is understood that various electronic files, whether media files or not, and whether remote or not, may be compared by using the method and the system of the embodiments of the invention. For example, two electronic files may be compared according to the following steps:
for each electronic file:
obtaining M ranges of bytes, M>=2, at predetermined offsets relative to the beginning of the electronic file, each range of bytes being shorter than a file size of the electronic file;
concatenating bytes in the M ranges into a string of bytes;
generating a signature of the electronic file using the string of bytes; and
comparing signatures of the two files to determine if the electronic files are the same.

Conveniently, generating the signature of the electronic file comprises hashing the string of bytes into a file key, and comparing signatures comprises comparing the two file keys.

A corresponding computer system for comparing two electronic files may be implemented in a general purpose or specialized computer having a processor and a computer readable medium having computer readable instructions stored thereon for execution by the processor to perform the steps of the method described above.

Although the embodiments of the invention have been described in detail, it will be apparent to one skilled in the art that variations and modifications to the embodiment may be made within the scope of the following claims.

What is claimed is:

1. A cache service module, comprising:
a non-transitory computer readable storage medium having computer readable instructions stored thereon for execution by a processor, causing the processor to:
(a) obtain:
(i) a content length of a remote media file;
(ii) a predetermined number of M ranges of bytes, M>=2, at respective predetermined offsets relative to the beginning of the remote media file, each range of bytes having a predetermined byte length such that:
(ii-1) locations of the offsets and the number M of the ranges of bytes being determined depending on the content length of the remote media file; and
(ii-2) a sum of all M ranges of bytes being less than the content length of the remote media file;
(b) generate a digital signature for the remote media file using bytes from the obtained M ranges of bytes; and
(c) upon a request for the remote media file, determine a presence of a copy of the remote media file in the cache memory, including interrogating the cache memory with the digital signature.

2. The cache service module of claim 1, wherein the M ranges of bytes are not overlapping.

3. The cache service module of claim 1, wherein the M ranges of bytes are not adjacent to each other.

4. The cache service module of claim 1, wherein the sum of all M ranges is less than about 1% of the content length of the remote media file.

5. The cache service module of claim 1, wherein a first range of bytes is obtained at an offset of zero relative to the beginning of the remote media file.

6. The cache service module of claim 1, wherein the offsets are specified as proportions of the content length of the remote media file.

7. The cache service module of claim 1, wherein a different number of bytes is specified for at least some ranges of bytes in the M ranges of bytes.

8. The cache service module of claim 1, wherein the same number of bytes is specified for each byte range in the M ranges of bytes.

9. The cache service module of claim 1, wherein the computer readable instructions further cause the processor to concatenate all bytes in the M ranges of bytes into a string of bytes, and generate the digital signature using the string of bytes.

10. The cache service module of claim 1, wherein the computer readable instructions further cause the processor to obtain and store the copy of the remote media file along with the digital signature in the cache upon a number of requests from media client devices for the remote media file exceeding a predetermined threshold.

11. The cache service module of claim 1, wherein the computer readable instructions further cause the processor to store only the digital signature in the cache, provided a number of requests from media client devices for the remote media file is below a predetermined.

12. A system for caching media files, the system comprising:
a cache server comprising a cache service module, the cache service module comprising:
a non-transitory computer readable storage medium having computer readable instructions stored thereon for execution by a processor, causing the processor to:
(a) obtain:
(i) a content length of a remote media file;
(ii) a predetermined number of M ranges of bytes, M>=2, at
respective predetermined offsets relative to the beginning of the remote media file, each range of bytes having a predetermined byte length, such that:
(ii-1) locations of the offsets and the number M of the ranges of bytes being determined depending on the content length of the remote media file; and
(ii-2) a sum of all M ranges of bytes being less than the content length of the remote media file;
(b) generate a digital signature for the remote media file using bytes from the obtained M ranges of bytes; and
(c) upon a request for the remote media file, determine a presence of a copy of the remote media file in the cache memory, including interrogating the cache memory with the digital signature.

13. The system of claim 12, wherein the M ranges of bytes are not overlapping and not adjacent.

14. The system of claim 12, wherein the offsets are specified as proportions of the content length of the remote media file.

15. The system of claim 12, wherein a different number of bytes is specified for at least some ranges of bytes in the M ranges of bytes.

16. The system of claim 12, wherein, provided the copy of the remote media file is absent in the cache, the computer readable instructions further cause the processor to obtain and store the copy of the remote media file in the cache, upon a number of requests for the remote media file exceeding a predetermined threshold.

17. The system of claim 12, further comprising the cache memory for storing the copy of the remote media file.

18. A method for caching media files, comprising:
(a) obtaining:
(i) a content length of a remote media file;
(ii) a predetermined number of M ranges of bytes, M>=2, at respective predetermined offsets relative to the beginning of the remote media file, each range of bytes having a predetermined byte length, such that:
(ii-1) locations of the offsets and the number M of the ranges of bytes being determined depending on the content length of the remote media file and
(ii-2) a sum of all M ranges of bytes being less than the content length of the remote media file;
(b) generating a digital signature for the media file using bytes from the obtained M ranges of bytes; and
(c) upon a request for the remote media file, determining a presence of a copy of the remote media file in a cache memory, including interrogating the cache memory with the digital signature.

19. The method of claim 18, wherein the M ranges of bytes are not overlapping and not adjacent.

20. The method of claim 18, wherein the offsets are specified as proportions of the content length of the remote media file.

21. The method of claim 18, wherein a different number of bytes is specified for at least some ranges of bytes in the M ranges of bytes.

22. The method of claim 18, further comprising, obtaining and storing the copy of the remote media file in the cache memory, upon a number of requests for the remote media file exceeding a predetermined threshold.

23. The method of claim 18, further comprising storing only the digital signature in the cache memory, provided a number of requests from media client devices for the remote media file is below a predetermined threshold.

* * * * *